United States Patent
Hatakeyama et al.

(10) Patent No.: US 10,254,733 B2
(45) Date of Patent: Apr. 9, 2019

(54) MOTOR CONTROL DEVICE

(71) Applicant: HITACHI AUTOMOTIVE SYSTEMS, LTD., Ibaraki (JP)

(72) Inventors: Tatsuya Hatakeyama, Hitachinaka (JP); Hiroaki Igarashi, Hitachinaka (JP); Hideyuki Sakamoto, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 254 days.

(21) Appl. No.: 15/320,003

(22) PCT Filed: May 11, 2015

(86) PCT No.: PCT/JP2015/063405
§ 371 (c)(1),
(2) Date: Dec. 19, 2016

(87) PCT Pub. No.: WO2015/194282
PCT Pub. Date: Dec. 23, 2015

(65) Prior Publication Data
US 2017/0131698 A1 May 11, 2017

(30) Foreign Application Priority Data

Jun. 20, 2014 (JP) .................................. 2014-126920

(51) Int. Cl.
*G05B 19/042* (2006.01)
*G06F 11/30* (2006.01)
(Continued)

(52) U.S. Cl.
CPC ............ *G05B 19/0428* (2013.01); *B60L 1/00* (2013.01); *B60L 3/0084* (2013.01); *B60L 3/0092* (2013.01); *G06F 11/30* (2013.01);
*H02P 29/032* (2016.02); *B60L 2220/42* (2013.01); *G05B 2219/14006* (2013.01); *Y02T 10/646* (2013.01); *Y02T 90/16* (2013.01)

(58) Field of Classification Search
CPC ...... G05B 19/0428; G05B 2219/14006; H02P 29/032; B60L 3/0092; B60L 1/00; B60L 3/0084; B60L 2220/42; G06F 11/30; Y02T 10/646; Y02T 90/16
See application file for complete search history.

(56) References Cited

U.S. PATENT DOCUMENTS

2009/0183018 A1* 7/2009 Nakamura ............ B60W 50/04
713/323

FOREIGN PATENT DOCUMENTS

| JP | 07-43257 A | 2/1995 |
|---|---|---|
| JP | 2009-274569 A | 11/2009 |
| JP | 2013-149041 A | 8/2013 |

* cited by examiner

*Primary Examiner* — Cuong B Nguyen
(74) *Attorney, Agent, or Firm* — Volpe and Koenig, P.C.

(57) ABSTRACT

A motor control device avoids the difficulties associated with safely controlling a motor using a second calculation unit when a first calculation unit malfunctions. A motor control device monitors a malfunction of a first microcomputer and a malfunction of a first CPU of the first microcomputer and performs a determination based on a result of a second external communication functional unit. When the determination is normal, the process proceeds determine that the first CPU is normal and a second CPU malfunctions. Therefore, it is possible to continue processing using the first CPU in this case.

9 Claims, 8 Drawing Sheets

(51) Int. Cl.
  *B60L 3/00* (2019.01)
  *B60L 1/00* (2006.01)
  *H02P 29/032* (2016.01)

10,254,733 B2

MOTOR CONTROL DEVICE

TECHNICAL FIELD

The present invention relates to a motor control device to be mounted to a vehicle.

BACKGROUND ART

A safety protection system described in PTL 1 is capable of detecting a malfunction of a microcomputer that controls a device by comparing two calculation units, and notifies of an error or stops functioning at the time of the malfunction.

However, the notification of the error or the stop of the function is insufficient in a case in which the malfunction occurs when the vehicle travels at high speed or a high residual charge is present in the device in the safety protection system to be applied to a motor control device to be mounted to a vehicle. For example, in the case of an electric vehicle, it is necessary to prevent an electric shock when an accident occurs due to sudden stop of the motor during the high-speed driving or the malfunction occurs when the high residual charge is present in an inverter capacitor.

CITATION LIST

Patent Literature

PTL 1: JP 2013-149041 A

SUMMARY OF INVENTION

Technical Problem

When it is diagnosed that one of the calculation units malfunctions in the conventional control device as illustrated in PTL 1, it is difficult to continue control using the other calculation unit, and the continuity of the control of the motor mounted to the vehicle is not secured.

Solution to Problem

A motor control device according to claim 1 is provided with an integrated control unit that receives information relating to a malfunction from a first microcomputer and a second microcomputer and controls a motor. The first microcomputer includes a first CPU, a second CPU which has a first self-diagnosis functional unit, and a first internal communication functional unit which detects a malfunction of the first CPU through communication from the second CPU to the first CPU. The second microcomputer includes a third CPU and a second external communication functional unit which detects a malfunction of the first microcomputer through communication from the third CPU to the first microcomputer. The integrated control unit monitors the malfunction of the first CPU based on each malfunction detection result of the first internal communication functional unit and the second external communication functional unit even when the first self-diagnosis functional unit determines that the second CPU malfunctions in the first microcomputer, and continues processing of the first CPU based on a result of the monitoring.

Advantageous Effects of Invention

The present invention is capable of continuing control of a first CPU even when it is diagnosed that a second CPU malfunctions, and accordingly, it is possible to safely continue the control of a motor to be mounted to a vehicle.

DESCRIPTION OF EMBODIMENTS

First Embodiment

Figure 1:
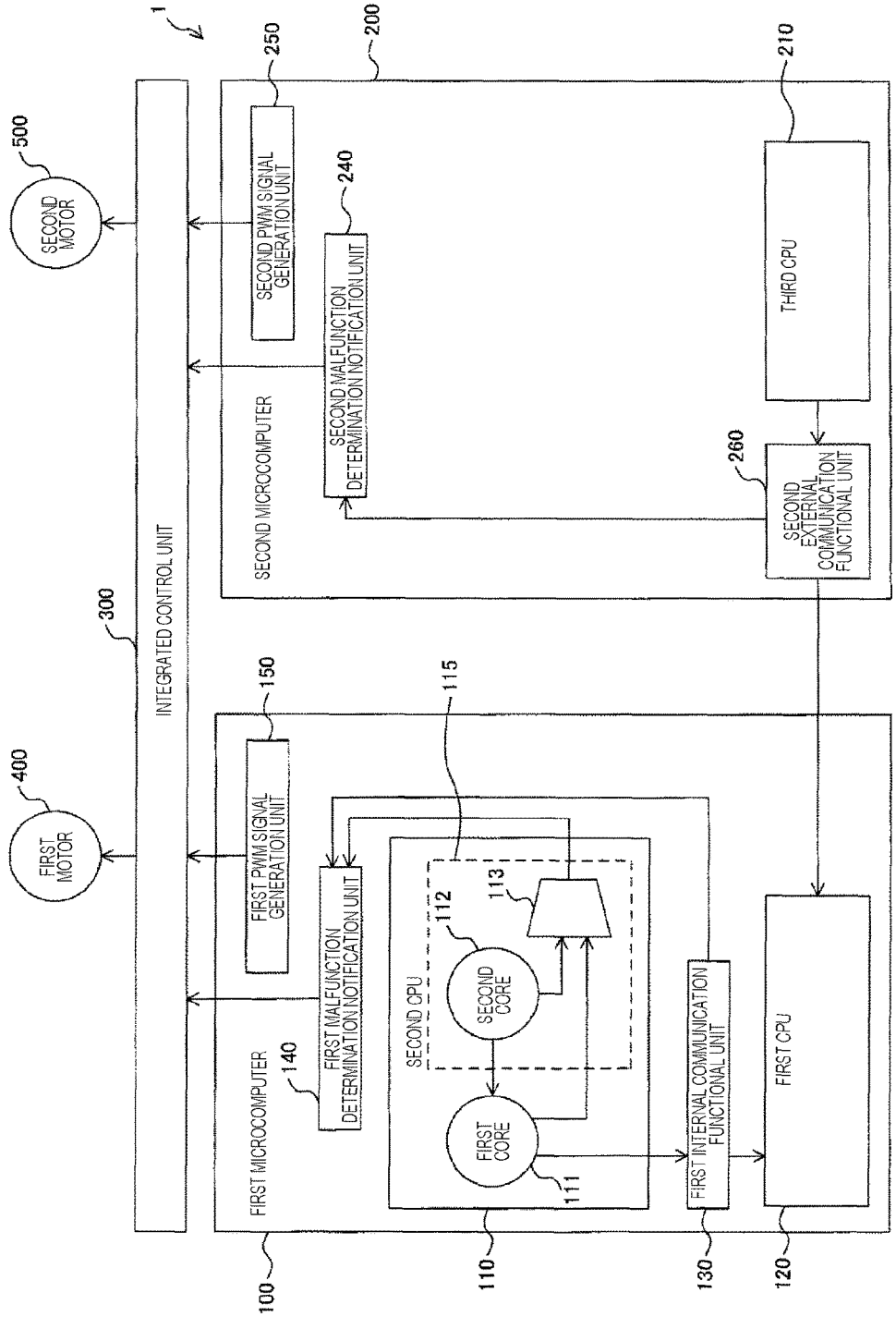
FIG. 1 is a circuit diagram of a motor control device according to a first embodiment.

FIG. 1 is a circuit diagram illustrating an overall configuration of a motor control device 1 according to a first embodiment. The motor control device 1 is provided with a first microcomputer 100, a second microcomputer 200, an integrated control unit 300, a first motor 400, and a second motor 500.

The first microcomputer 100 is provided with a first CPU 120, a second CPU 110, a first internal communication functional unit 130, a first malfunction determination notification unit 140, and a first PWM signal generation unit 150, and generates a PWM signal for control of a motor or performs diagnosis of a malfunction in the first CPU 120 and the second CPU 110 or the like. The first microcomputer 100 is a multi-core microcomputer which includes the second CPU 110 and the first CPU 120.

The first internal communication functional unit 130 is provided between the second CPU 110 and the first CPU 120 and detects the malfunction of the first CPU 120 by performing communication via a shared memory or the like.

The first malfunction determination notification unit 140 receives notification of the malfunction from the first internal communication functional unit 130 or the like and notifies the integrated control unit 300 of the CPU that has been determined to actually malfunction as a result of a retrial.

The first PWM signal generation unit 150 creates the PWM signal for the motor control and outputs the PWM signal to the integrated control unit 300. The first PWM signal generation unit 150 is operated by the second CPU 110.

The second CPU 110 is provided with a first core 111 and a first self-diagnosis functional unit 115. The first self-diagnosis functional unit 115 is provided with a second core 112 and a malfunction diagnosis unit 113.

The first core 111 has a calculation function. For example, examples of the function include general fetching of a command of a CPU, decoding, calculating, and outputting of a calculation result to a memory or the like. In addition, a malfunction in a bus, which is a peripheral module of the core of the second CPU 110, an IO controller, an internal memory, or the like is detected by the first core 111. Further, the first core 111 transmits the calculation result to the malfunction diagnosis unit 113.

The second core 112 has a calculation function. For example, examples of the function include general fetching of a command of a CPU, decoding, calculating, and outputting of a calculation result to a memory or the like. Further, the second core 112 performs the same calculation as the first core 111 and transmits the calculation result to the malfunction diagnosis unit 113.

The malfunction diagnosis unit 113 compares the calculation result of the first core 111 and the calculation result of the second core 112 and determines as abnormality when the both do not match each other. When it is difficult to be restored from the abnormality, it is determined as the malfunction of the second CPU 110, and the first malfunction determination notification unit 140 is notified of the malfunction.

The first self-diagnosis functional unit 115 includes the above-described second core and the malfunction diagnosis unit 113 that compares the calculation result of the first core 111 and the calculation result of the second core 112 and diagnoses the malfunction.

The first internal communication functional unit 130 is provided between the second CPU 110 and the first CPU 120, performs communication with the first CPU 120 via a shared memory or the like, and detects the malfunction of the first CPU 120 through the communication via the shared memory or the like. When the malfunction is detected, the first malfunction determination notification unit 140 is notified of the malfunction.

The first malfunction determination notification unit 140 receives the notification of the malfunction from the first self-diagnosis functional unit 115 and the first internal communication functional unit 130 and notifies the integrated control unit 300 of the CPU that has been determined to actually malfunction as the result of the retrial, that is, when being notified of the malfunction a predetermined number of times. To be specific, when receiving the notification of the malfunction from the first self-diagnosis functional unit 115 and it is determined as the actual malfunction, the first malfunction determination notification unit 140 notifies the integrated control unit 300 that the second CPU 110 malfunctions. In addition, when receiving the notification of the malfunction from the first internal communication functional unit 130 and it is determined as the actual malfunction, the first malfunction determination notification unit 140 notifies the integrated control unit 300 that the first CPU 120 malfunctions.

The second microcomputer 200 is provided with a third CPU 210, a second external communication functional unit 260, a second malfunction determination notification unit 240, and a second PWM signal generation unit 250, and generates the PWM signal for the motor control or performs diagnosis of a malfunction of the first microcomputer 100.

The second external communication functional unit 260 detects the malfunction of the first microcomputer 100 by communicating with the first CPU 120 of the first microcomputer 100 and the second microcomputer 200. To be specific, example calculation from the third CPU 210 is processed again by the first CPU 120, and the second external communication functional unit 260 confirms whether both results thereof match each other. When both the results do not match each other, it is determined that the first CPU 120 malfunctions, and the second malfunction determination notification unit 240 is notified of the malfunction.

The second malfunction determination notification unit 240 receives the notification of the malfunction from the second external communication functional unit 260 and notifies the integrated control unit 300 of the CPU that has been determined to actually malfunction as a result of a retrial. To be specific, when receiving the notification of the malfunction from the second external communication functional unit 260 and it is determined as the actual malfunction, the second malfunction determination notification unit 240 notifies the integrated control unit 300 that the first CPU 120 malfunctions.

The second PWM signal generation unit 250 creates the PWM signal for the motor control and outputs the PWM signal to the integrated control unit 300.

The integrated control unit 300 performs determination of a malfunction based on each notification from the first malfunction determination notification unit 140 and the second malfunction determination notification unit 240, supplies the PWM signal transmitted from the first PWM signal generation unit 150 to the first motor 400, and supplies the PWM signal transmitted from the second PWM signal generation unit 250 to the second motor 500 when it is determined to be normal. The integrated control unit 300 performs the determination of the malfunction based on each notification from the first malfunction determination notification unit 140 and the second malfunction determination notification unit 240 and performs control so as not to supply the PWM signal transmitted from the first PWM signal generation unit 150 to the first motor 400, for example, when it is determined that the second CPU 110 malfunctions. Here, the first motor 400 is a drive motor which is used to drive the vehicle, and the second motor 500 is a regenerative motor.

Figure 2:
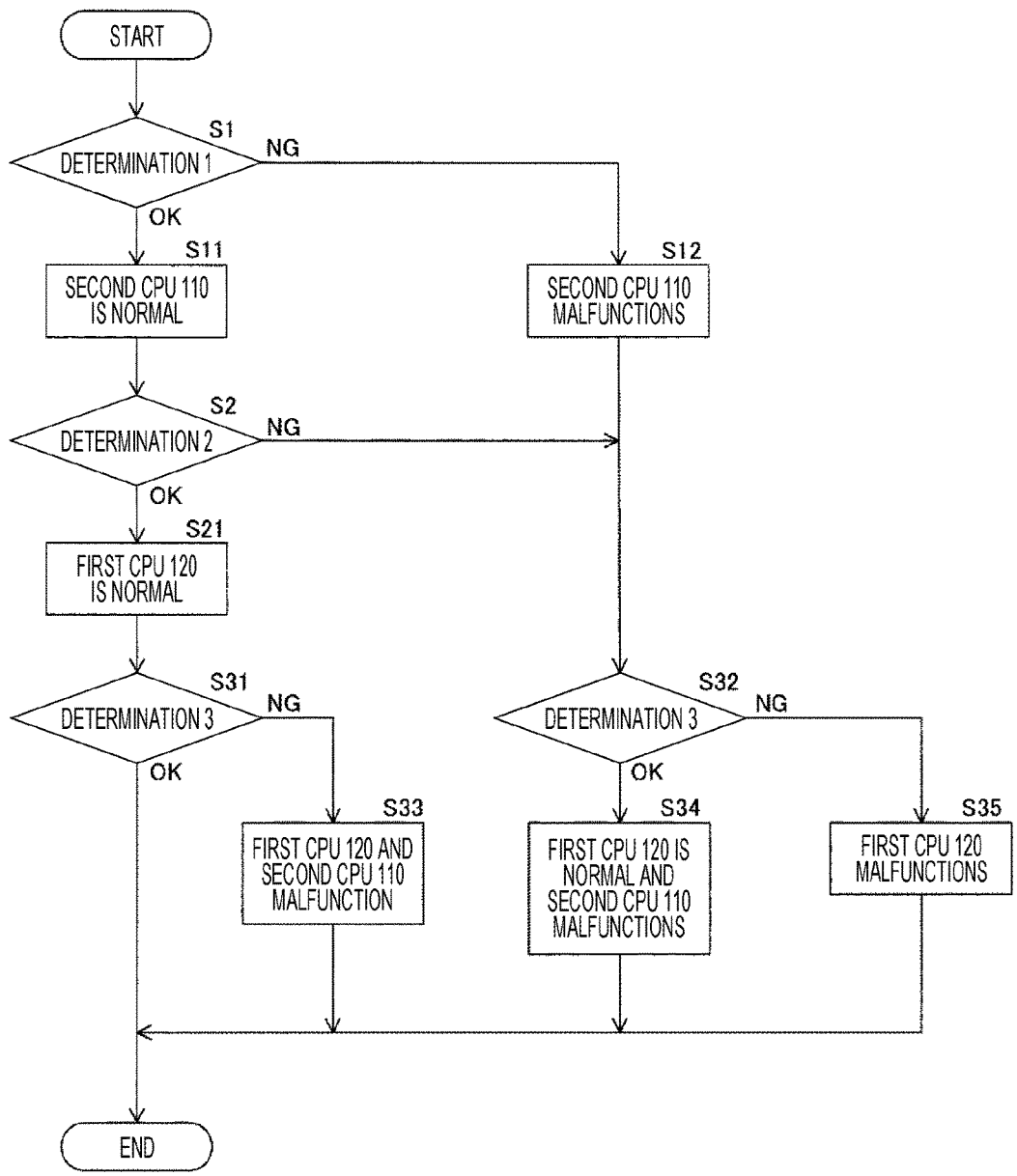
FIG. 2 is a flowchart for describing an operation according to the first embodiment.

FIG. 2 is a flowchart for describing a malfunction determination operation of the integrated control unit 300. The first microcomputer 100 and the second microcomputer 200 constantly perform the malfunction diagnosis, and the integrated control unit 300 is notified of each result of the diagnosis by the first malfunction determination notification unit 140 of the first microcomputer 100 and the second malfunction determination notification unit 240 of the second microcomputer 200.

The flowchart of FIG. 2 to be described hereinafter illustrates an operation that is executed by a control unit (not illustrated) of the integrated control unit 300. Incidentally, a logic circuit operating in the same manner as the operation illustrated in this flowchart may be provided inside the integrated control unit 300 as hardware.

The integrated control unit 300 starts the determination of the malfunction in the second CPU 110 and the first CPU 120 of the first microcomputer 100. Incidentally, the malfunction represents a state in which an operation that is not assumed is steadily and continuously executed and includes a hardware malfunction and a software malfunction.

In step S1, the malfunction of the second CPU 110 of the first microcomputer 100 is monitored, and the determination is performed based on a result of the first self-diagnosis functional unit 115 of the first microcomputer 100 (Determination Mode 1). When it is normal, the process proceeds to step S11, and it is determined that the second CPU 110 is normal. In the case of the malfunction, the process proceeds to step S12, and it is determined that the second CPU 110 malfunctions. The process proceeds to step S2 after the determination in step S11, and the process proceeds to step S32 after the determination in step S12.

In step S2, the malfunction is determined between the first CPU 120 and the second CPU 110 of the first microcomputer 100, and the determination is performed based on a result of the first internal communication functional unit 130 (Determination Mode 2). When it is normal, the process proceeds to step S21, and it is determined that the first CPU 120 is normal. In the case of the malfunction, the process proceeds to step S32. The process proceeds to step S31 after the determination in step S21.

In step S31, the malfunction of the first microcomputer 100 and the malfunction of the first CPU 120 of the first microcomputer are monitored, and the determination is performed based on a result of the second external communication functional unit 260 (Determination Mode 3). When it is normal, it is determined that the first CPU 120 is normal as it has been determined already as in the above-described step S21. In the case of the malfunction, the process proceeds to step S33, and it is determined that the second CPU 110 and the first CPU 120 malfunction. This determination is diagnosed on consideration of a case in which the first self-diagnosis functional unit 115 malfunctions, and there is inconsistency as compared to each determination in step S11 and step S21, and thus, it is determined that the second CPU 110 and the first CPU 120 malfunction.

In step S32, the malfunction of the first microcomputer 100 and the malfunction of the first CPU 120 of the first microcomputer are monitored similarly to step S31, and the determination is performed based on the result of the second external communication functional unit 260 (Determination Mode 3). When it is normal, the process proceeds to step S34, and it is determined that the first CPU 120 is normal and the second CPU 110 malfunctions. This determination has inconsistency as compared to the determination in step S2, and it is determined that the second CPU 110 malfunctions, and further, it is determined that the first CPU 120 is normal according to step S32. Therefore, it is possible to continue the processing of the first CPU 120 in this case.

The process proceeds to step S35 in the case of the malfunction in step S32, and it is determined that the first CPU 120 malfunctions.

The above-described malfunction determination assuming that, the second microcomputer 200 does not malfunction. The integrated control unit 300 performs the control such that the PWM signal transmitted from the first PWM signal generation unit 150 is not supplied to the first motor 400 but is blocked, for example, when it is determined that the first CPU 120 or the second CPU 110 malfunctions.

Second Embodiment

Figure 3:
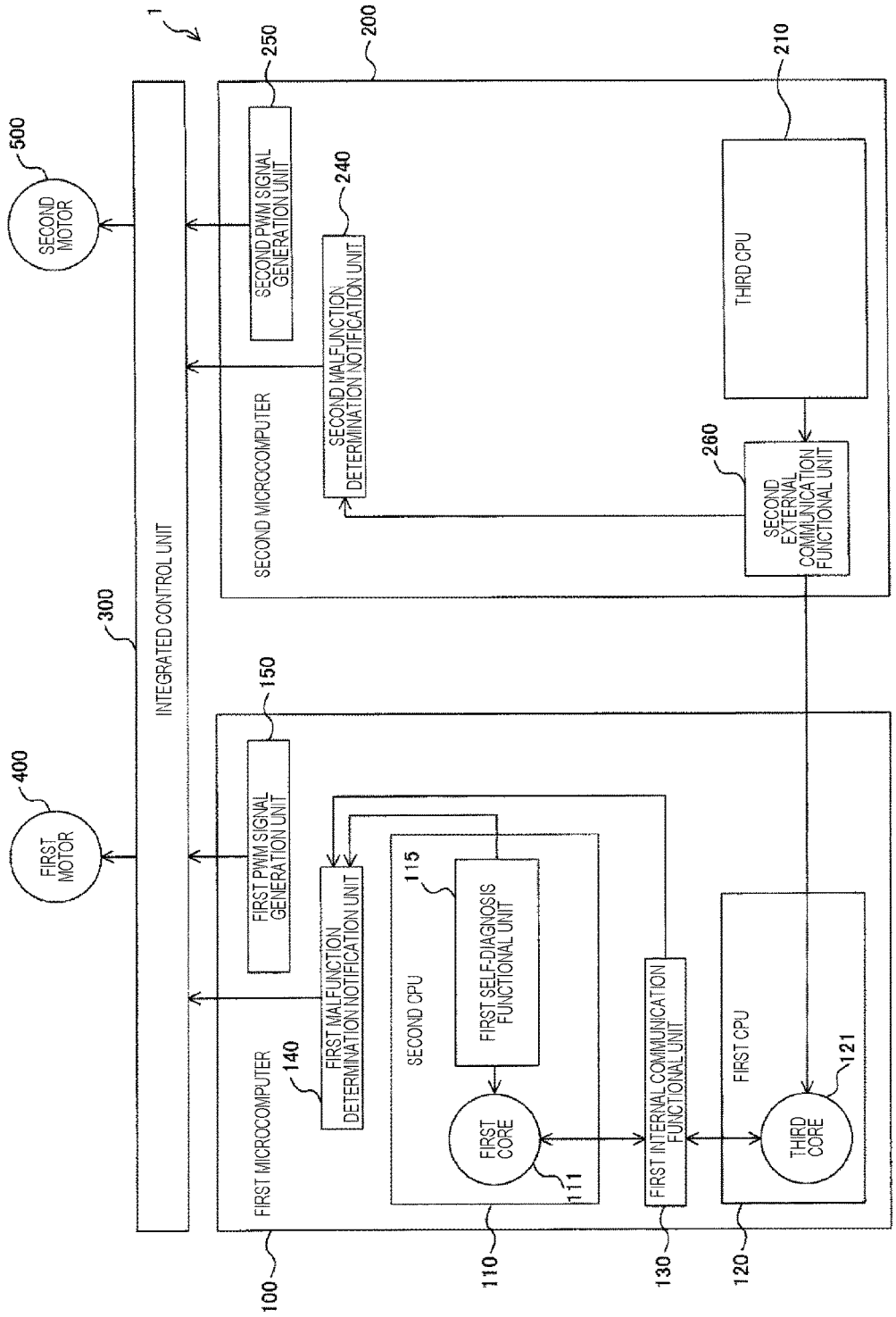
FIG. 3 is a circuit diagram of a motor control device according to a second embodiment.

FIG. 3 is a circuit diagram illustrating an overall configuration of a motor control device 1 according to a second embodiment. Each configuration of a first internal communication functional unit 130 and a first CPU 120 is different from that of the first embodiment. The motor control device 1 is provided with a first microcomputer 100, a second microcomputer 200, an integrated control unit 300, a first motor 400, and a second motor 500.

The first microcomputer 100 is provided with the first CPU 120, a second CPU 110, the first internal communication functional unit 130, a first malfunction determination notification unit 140, and a first PWM signal generation unit 150, and generates a PWM signal for control of a motor or performs diagnosis of a malfunction in the first CPU 120 and the second CPU 110 or the like. The first microcomputer 100 is a multi-core microcomputer which includes the second CPU 110 and the first CPU 120.

The first internal communication functional unit 130 is provided between the second CPU 110 and the first CPU 120 and detects the malfunction of the first CPU 120 by performing communication via a shared memory or the like.

The first malfunction determination notification unit 140 receives notification of the malfunction from the first internal communication functional unit 130 or the like and notifies the integrated control unit 300 of the CPU that has been determined to actually malfunction as a result of a retrial.

The first PWM signal generation unit 150 creates the PWM signal for the motor control and outputs the PWM signal to the integrated control unit 300. The first PWM signal generation unit 150 is operated by the second CPU 110.

The second CPU 110 is provided with a first core 111 and a first self-diagnosis functional unit 115. The second CPU 110 has the same configuration as the configuration illustrated in the first embodiment, and thus, details thereof will not be described.

The first self-diagnosis functional unit 115 diagnoses the malfunction of the second CPU 110 by comparing a calculation result of the first core 111 and a calculation result of a second core (not illustrated) inside the first self-diagnosis functional unit 115, and notifies the first malfunction determination notification unit 140 of the malfunction.

The first CPU 120 is provided with a third core 121, and the third core 121 has a calculation function. For example, examples of the function include general fetching of a command of a CPU, decoding, calculating, and outputting of a calculation result to a memory or the like.

The first internal communication functional unit 130 is provided between the first core 111 of the second CPU 110 and the third core 121 of the first CPU 120, the second CPU 110 performs communication with the first CPU 120 via a shared memory, and the malfunction of the first CPU 120 is detected by performing the communication via the shared memory or the like. Further, the first CPU 120 performs communication with the second CPU 110 via the shared memory or the like, and the malfunction of the second CPU 110 is notified by performing the communication via the shared memory or the like. When the malfunction is detected, the first malfunction determination notification unit 140 is notified of the malfunction.

The first malfunction determination notification unit 140 receives the notification of the malfunction from the first self-diagnosis functional unit 115 and the first internal communication functional unit 130, and notifies the integrated control unit 300 of the CPU that has been determined to actually malfunction as a result of a retrial. To be specific, when receiving the notification of the malfunction from the first self-diagnosis functional unit 115 and it is determined as the actual malfunction, the first malfunction determination notification unit 140 notifies the integrated control unit 300 that the second CPU 110 malfunctions. In addition, the integrated control unit 300 is notified that the first CPU 120 malfunctions when receiving the notification of the malfunction of the first internal communication functional unit 130 and it is determined as the actual malfunction, and further, that the second CPU 110 malfunctions when receiving the notification of the malfunction of the first internal communication functional unit 130 and it is determined as the actual malfunction.

The second microcomputer 200 is provided with a third CPU 210, a second external communication functional unit 260, a second malfunction determination notification unit 240, and a second PWM signal generation unit 250, and generates the PWM signal for the motor control or performs diagnosis of a malfunction of the first microcomputer 100.

The second external communication functional unit 260 detects the malfunction of the first microcomputer 100 by communicating with the third core 121 of the first CPU 120 of the first microcomputer 100 and the second microcomputer 200. To be specific, example calculation from the third CPU 210 is processed again by the third core 121 of the first CPU 120, and the second external communication functional unit 260 confirms whether both results thereof match each other. When both the results do not match each other, it is determined that the first CPU 120 malfunctions, and the second malfunction determination notification unit 240 is notified of the malfunction.

The second malfunction determination notification unit 240 receives the notification of the malfunction from the second external communication functional unit 260 and notifies the integrated control unit 300 of the CPU that has been determined to actually malfunction as a result of a retrial. To be specific, when receiving the notification of the malfunction from the second external communication functional unit 260 and it is determined as the actual malfunction, the second malfunction determination notification unit 240 notifies the integrated control unit 300 that the first CPU 120 malfunctions.

The second PWM signal generation unit 250 creates the PWM signal for the motor control and outputs the PWM signal to the integrated control unit 300.

The integrated control unit 300 performs determination of a malfunction based on each notification from the first malfunction determination notification unit 140 and the second malfunction determination notification unit 240, supplies the PWM signal transmitted from the first PWM signal generation unit 150 to the first motor 400, and supplies the PWM signal transmitted from the second PWM signal generation unit 250 to the second motor 500 when it is determined to be normal. The integrated control unit 300 performs the determination of the malfunction based on each notification from the first malfunction determination notification unit 140 and the second malfunction determination notification unit 240 and performs control so as not to supply the PWM signal transmitted from the first PWM signal generation unit 150 to the first motor 400, for example, when it is determined that the second CPU 110 malfunctions. Here, the first motor 400 is a drive motor which is used to drive the vehicle, and the second motor 500 is a regenerative motor.

Figure 4:
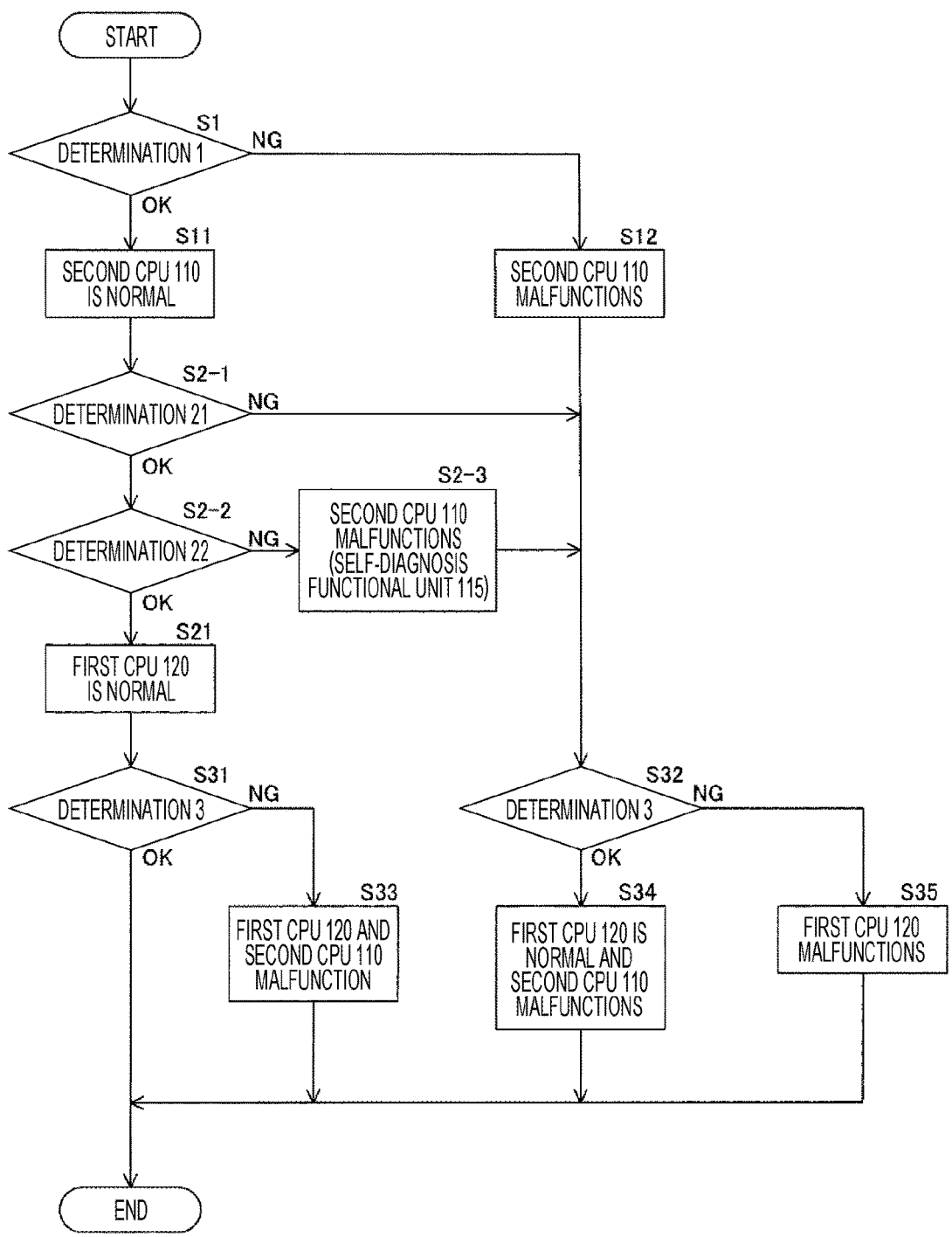
FIG. 4 is a flowchart for describing an operation according to the second embodiment.

FIG. 4 is a flowchart for describing a malfunction determination operation of the integrated control unit 300. The first microcomputer 100 and the second microcomputer 200 constantly perform the malfunction diagnosis, and the integrated control unit 300 is notified of each result of the diagnosis by the first malfunction determination notification unit 140 of the first microcomputer 100 and the second malfunction determination notification unit 240 of the second microcomputer 200.

The flowchart of FIG. 4 to be described hereinafter illustrates an operation that is executed by a control unit (not illustrated) of the integrated control unit 300. Incidentally, a logic circuit operating in the same manner as the operation illustrated in this flowchart may be provided inside the integrated control unit 300 as hardware.

The integrated control unit 300 starts the determination of the malfunction in the second CPU 110 and the first CPU 120 of the first microcomputer 100. Incidentally, the malfunction represents a state in which an operation that is not assumed is steadily and continuously executed and includes a hardware malfunction and a software malfunction.

In step S1, the malfunction of the second CPU 110 of the first microcomputer 100 is monitored, and the determination is performed based on a result of the first self-diagnosis functional unit 115 of the first microcomputer 100 (Determination Mode 1). When it is normal, the process proceeds to step S11, and it is determined that the second CPU 110 is normal. In the case of the malfunction, the process proceeds to step S12, and it is determined that the second CPU 110 malfunctions. The process proceeds to step S2-1 after the determination in step S11, and the process proceeds to step S32 after the determination in step S12.

In step S2-1, the malfunction of the second CPU 110 is monitored by the first CPU 120 of the first microcomputer 100, and the determination is performed based on a result of the first internal communication functional unit 130 (Determination Mode 21). When it is normal, the process proceeds to step S2-2. In the case of the malfunction, the process proceeds to step S32.

In step S2-2, the malfunction of the first CPU 120 is monitored by the second CPU 110 of the first microcomputer 100, and the determination is performed based on a result of the first internal communication functional unit 130 (Determination Mode 22). When it is normal, the process proceeds to step S21, and it is determined that the first CPU 120 is normal. In the case of the malfunction, the process proceeds to step S2-3.

In step S2-3, it is determined that the second CPU 110 of the first microcomputer 100 malfunctions. In this case, it indicates that the first self-diagnosis functional unit 115 of the second CPU 110 malfunctions. The process proceeds to step S32 after the determination in step S2-3.

The process proceeds to step S31 after the determination in step S21. In step S31, the malfunction of the first microcomputer 100 and the malfunction of the first CPU 120 of the first microcomputer are monitored, and the determination is performed based on a result of the second external communication functional unit 260 (Determination Mode 3). When it is normal, it is determined that the first CPU 120 is normal as it has been determined already as in the above-described step S21. In the case of the malfunction, the process proceeds to step S33, and it is determined that the second CPU 110 and the first CPU 120 malfunction. This determination is diagnosed on consideration of a case in which the first self-diagnosis functional unit 115 malfunctions, and there is inconsistency as compared to each determination in step S11 and step S21, and thus, it is determined that the second CPU 110 and the first CPU 120 malfunction.

In step S32, the malfunction of the first microcomputer 100 and the malfunction of the first CPU 120 of the first microcomputer are monitored similarly to step S31, and the determination is performed based on the result of the second external communication functional unit 260 (Determination Mode 3). When it is normal, the process proceeds to step S34, and it is determined that the first CPU 120 is normal and the second CPU 110 malfunctions. This determination has inconsistency as compared to the determination in step S2, and it is determined that the second CPU 110 malfunctions, and further, it is determined that the first CPU 120 is normal according to step S32. Therefore, it is possible to continue the processing of the first CPU 120 in this case.

The process proceeds to step S35 in the case of the malfunction in step S32, and it is determined that the first CPU 120 malfunctions.

The above-described malfunction determination assuming that, the second microcomputer 200 does not malfunction. The integrated control unit 300 performs the control such that the PWM signal transmitted from the first PWM signal generation unit 150 is not supplied to the first motor 400 but is blocked, for example, when it is determined that the first CPU 120 or the second CPU 110 malfunctions.

It is possible to detect each malfunction of the first CPU 120 and the second CPU 110 in the first embodiment, and it is possible to detect each malfunction of the first CPU 120, the second CPU 110, and the first self-diagnosis functional unit 115 in the second embodiment.

Third Embodiment

Figure 5:
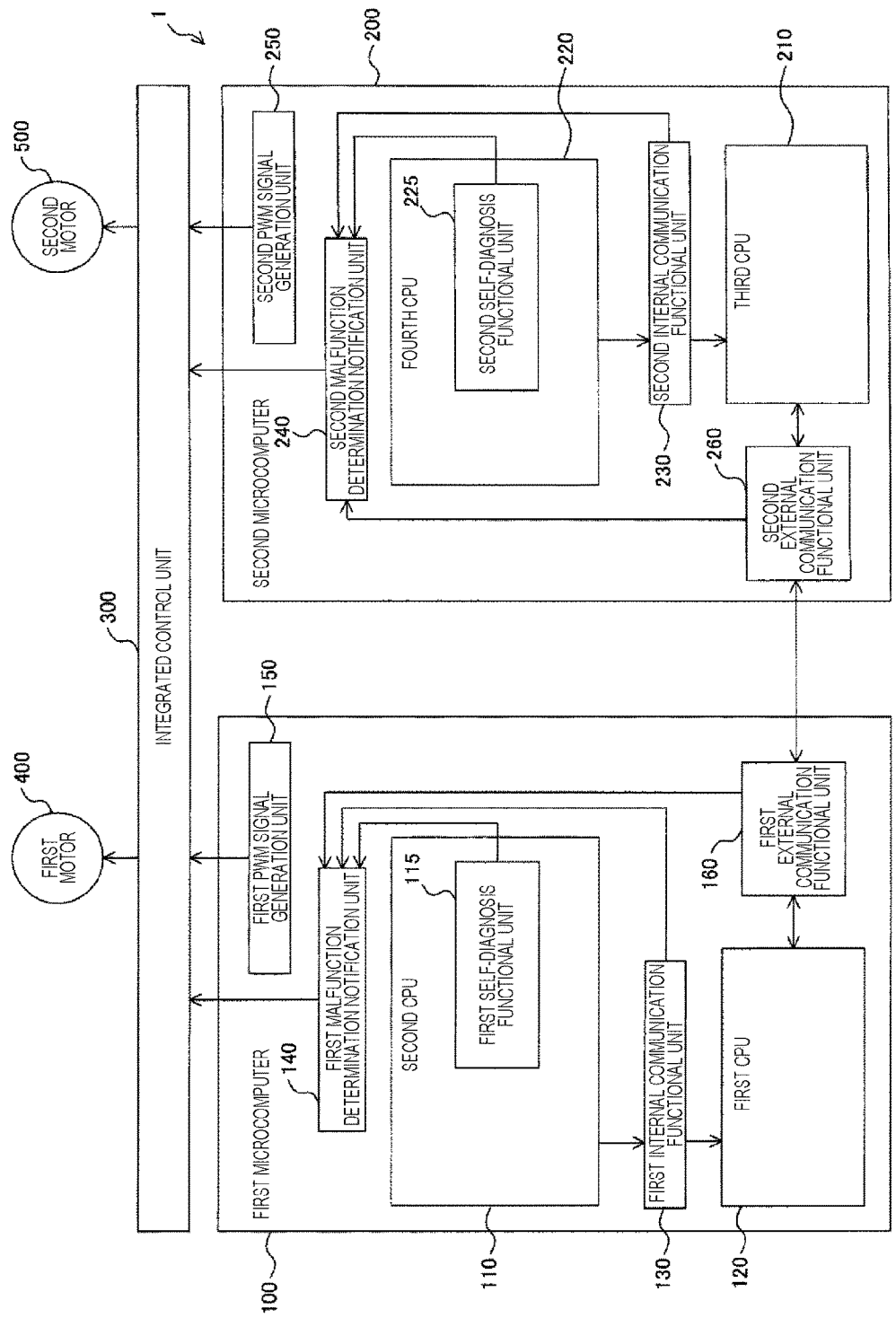
FIG. 5 is a circuit diagram of a motor control device according to a third embodiment.

FIG. 5 is a circuit diagram illustrating an overall configuration of a motor control device 1 according to a third embodiment. It is configured such that a first external communication functional unit 160, a fourth CPU 220, and a second internal communication functional unit 230 are added to the configuration according to the first embodiment. The motor control device 1 is provided with a first microcomputer 100, a second microcomputer 200, an integrated control unit 300, a first motor 400, and a second motor 500.

The first microcomputer 100 is provided with a first CPU 120, a second CPU 110, a first internal communication functional unit 130, a first malfunction determination notification unit 140, and a first PWM signal generation unit 150, and generates a PWM signal for control of a motor or performs diagnosis of a malfunction in the first CPU 120 and the second CPU 110 or the like. The first microcomputer 100 is a multi-core microcomputer which includes the second CPU 110 and the first CPU 120.

The first internal communication functional unit 130 is provided between the second CPU 110 and the first CPU 120 and detects the malfunction of the first CPU 120 by performing communication via a shared memory or the like.

The first malfunction determination notification unit 140 receives notification of the malfunction from a first self-diagnosis functional unit 115, the first internal communication functional unit 130, and the first external communication functional unit 160 to be described later, and notifies the integrated control unit 300 of the CPU that has been determined to actually malfunction as a result of a retrial. To be specific, when receiving the notification of the malfunction from the first self-diagnosis functional unit 115 and it is determined as the actual malfunction, the first malfunction determination notification unit 140 notifies the integrated control unit 300 that the second CPU 110 malfunctions. In addition, when receiving the notification of the malfunction from the first internal communication functional unit 130 and it is determined as the actual malfunction, the first malfunction determination notification unit 140 notifies the integrated control unit 300 that the first CPU 120 malfunctions.

The first PWM signal generation unit 150 creates the PWM signal for the motor control and outputs the PWM signal to the integrated control unit 300. The first PWM signal generation unit 150 is operated by the second CPU 110.

The second CPU 110 is provided with the first self-diagnosis functional unit 115. The second CPU 110 has the same configuration as the configuration illustrated in the first embodiment, and thus, details thereof will not be described.

The first self-diagnosis functional unit 115 diagnoses the malfunction of the second CPU 110 by comparing a calculation result of a first core 111 (not illustrated) and a calculation result of a second core 112, and notifies the first malfunction determination notification unit 140 of the malfunction.

The first internal communication functional unit 130 is provided between the second CPU 110 and the first CPU 120, the second CPU 110 performs communication with the first CPU 120 via a shared memory or the like, and the malfunction of the first CPU 120 is detected by performing the communication via the shared memory or the like. When the malfunction is detected, the first malfunction determination notification unit 140 is notified of the malfunction.

The first external communication functional unit 160 detects the malfunction of the second microcomputer 200 by communicating with a third CPU 210 of the second microcomputer 200 and the first microcomputer 100. To be specific, example calculation from the first CPU 120 is processed again by the third CPU 210 using a second external communication functional unit 260, and the second external communication functional unit 260 receives both results thereof and confirms whether both the results match each other. When both the results do not match each other, it is determined that the third CPU 210 malfunctions, and the first malfunction determination notification unit 140 is notified of the malfunction.

The second microcomputer 200 is provided with the third CPU 210, the fourth CPU 220, the second internal communication functional unit 230, the second external communication functional unit 260, a second malfunction determination notification unit 240, and a second PWM signal generation unit 250, and generates a PWM signal for control of a motor or performs self-diagnosis of the second microcomputer 200 and diagnosis of a malfunction in the first microcomputer 100. The second microcomputer 200 is a multi-core microcomputer which includes the fourth CPU 220 and the third CPU 210.

The fourth CPU 220 is provided with a second self-diagnosis functional unit 225. The second self-diagnosis functional unit 225 has the same configuration as the first self-diagnosis functional unit 115 of the second CPU 110, diagnoses a malfunction of the fourth CPU 220, and notifies the second malfunction determination notification unit 240 of the malfunction.

The second internal communication functional unit 230 is provided between the fourth CPU 220 and the third CPU 210, the fourth CPU 220 performs communication with the third CPU 210 via a shared memory or the like, and a malfunction of the third CPU 210 is detected by performing the communication via the shared memory or the like. When the malfunction is detected, the second malfunction determination notification unit 240 is notified of the malfunction.

The second external communication functional unit 260 detects the malfunction of the first microcomputer 100 by communicating with the first CPU 120 of the first microcomputer 100 and the second microcomputer 200. To be specific, example calculation from the third CPU 210 is processed again by the first CPU 120 using the first external communication functional unit 160, and first external communication functional unit 160 receives both results thereof and confirms whether both the results match each other. When both the results do not match each other, it is determined that the first CPU 120 malfunctions, and the second malfunction determination notification unit 240 is notified of the malfunction.

The second malfunction determination notification unit 240 receives the notification of the malfunction from the second self-diagnosis functional unit 225, the second internal communication functional unit 230, and the second external communication functional unit 260, and notifies the integrated control unit 300 of the CPU that has been determined to actually malfunction as a result of a retrial. To be specific, when receiving the notification of the malfunction from the second self-diagnosis functional unit 225 and it is determined as the actual malfunction, the second malfunction determination notification unit 240 notifies the integrated control unit 300 that the fourth CPU 220 malfunctions. In addition, when receiving the notification of the malfunction from the second internal communication functional unit 230 and it is determined as the actual malfunction, the second malfunction determination notification unit 240 notifies the integrated control unit 300 that the third CPU 210 malfunctions. In addition, when receiving the notification of the malfunction from the second external communication functional unit 260 and it is determined as the actual malfunction, the second malfunction determination notification unit 240 notifies the integrated control unit 300 that the first CPU 120 malfunctions.

The second PWM signal generation unit 250 creates the PWM signal for the motor control and outputs the PWM signal to the integrated control unit 300.

The integrated control unit 300 performs determination of a malfunction based on each notification from the first malfunction determination notification unit 140 and the second malfunction determination notification unit 240, supplies the PWM signal transmitted from the first PWM signal generation unit 150 to the first motor 400, and supplies the PWM signal transmitted from the second PWM signal generation unit 250 to the second motor 500 when it is determined to be normal. The integrated control unit 300 performs the determination of the malfunction based on each notification from the first malfunction determination notification unit 140 and the second malfunction determination notification unit 240 and performs control so as not to supply the PWM signal transmitted from the first PWM signal generation unit 150 to the first motor 400, for example, when it is determined that the second CPU 110 malfunctions. Here, the first motor 400 is a drive motor which is used to drive the vehicle, and the second motor 500 is a regenerative motor.

Figure 6:
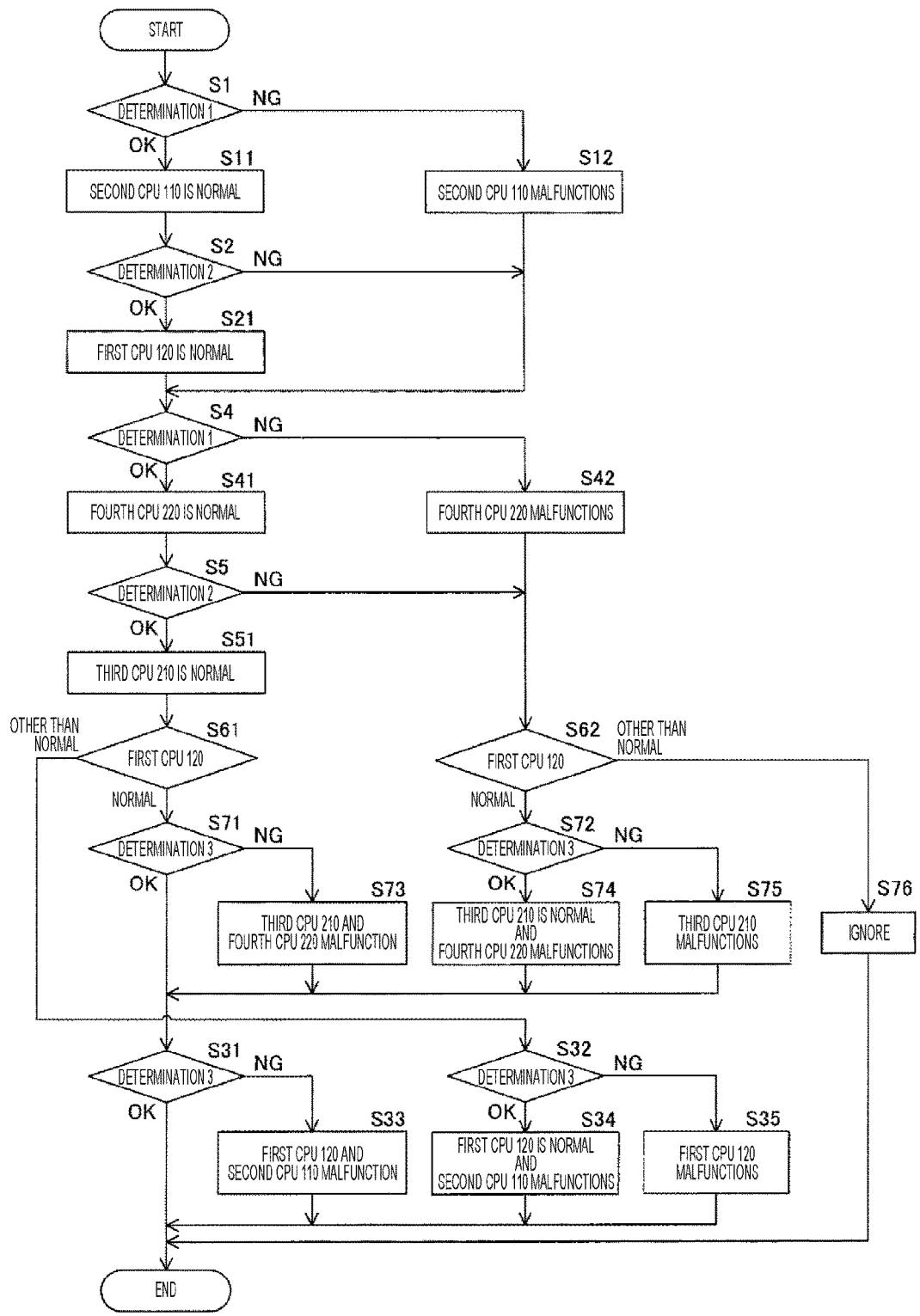
FIG. 6 is a flowchart for describing an operation according to the third embodiment.

FIG. 6 is a flowchart for describing a malfunction determination operation of the integrated control unit 300.

The first microcomputer 100 and the second microcomputer 200 constantly perform the malfunction diagnosis, and the integrated control unit 300 is notified of each result of the diagnosis by the first malfunction determination notification unit 140 of the first microcomputer 100 and the second malfunction determination notification unit 240 of the second microcomputer 200.

The flowchart of FIG. 6 to be described hereinafter illustrates an operation that is executed by a control unit (not illustrated) of the integrated control unit 300. Incidentally, a logic circuit operating in the same manner as the operation illustrated in this flowchart may be provided inside the integrated control unit 300 as hardware.

The integrated control unit 300 starts the determination of the malfunction in the first microcomputer 100 and the second microcomputer 200. Incidentally, the malfunction represents a state in which an operation that is not assumed is steadily and continuously executed and includes a hardware malfunction and a software malfunction.

In step S1, the malfunction of the second CPU 110 of the first microcomputer 100 is monitored, and the determination is performed based on a result of the first self-diagnosis functional unit 115 of the first microcomputer 100 (Determination Mode 1). When it is normal, the process proceeds to step S11, and it is determined that the second CPU 110 is normal. In the case of the malfunction, the process proceeds to step S12, and it is determined that the second CPU 110 malfunctions. The process proceeds to step S2 after the determination in step S11, and the process proceeds to step S4 after the determination in step S12.

In step S2, the malfunction is determined between the first CPU 120 and the second CPU 110 of the first microcomputer 100, and the determination is performed based on a result of the first internal communication functional unit 130 (Determination Mode 2). When it is normal, the process proceeds to step S21, and it is determined that the first CPU 120 is normal. In the case of the malfunction, the process proceeds to step S4. The process proceeds to step S4 after the determination in step S21.

In step S4, the malfunction of the fourth CPU 220 of the second microcomputer 200 is monitored, and the determination is performed based on a result of the second self-diagnosis functional unit 225 of the second microcomputer 200 (Determination Mode 1). When it is normal, the process proceeds to step S41, and it is determined that the fourth CPU 220 is normal. In the case of the malfunction, the process proceeds to step S42, and it is determined that the fourth CPU 220 malfunctions. The process proceeds to step S5 after the determination in step S41, and the process proceeds to step S62 after the determination in step S42.

In step S5, the malfunction is monitored between the third CPU 210 and the fourth CPU 220 of the second microcomputer 200, and the determination is performed based on a result of the second internal communication functional unit 230 (Determination Mode 2). When it is normal, the process proceeds to step S51, and it is determined that the third CPU 210 is normal. In the case of the malfunction, the process proceeds to step S62. The process proceeds to step S61 after the determination in step S51.

In step S61, it is determined whether the first CPU 120 is normal, and the process proceeds to step S71 when it is determined to be normal or step S32 when it is determined not to be normal. The determination in this step is performed based on a result of the determination in step S1.

In step S32, the malfunction of the first microcomputer 100 and the malfunction of the first CPU 120 of the first microcomputer are monitored, and the determination is performed based on a result of the second external communication functional unit 260 (Determination Mode 3). When it is normal, the process proceeds to step S34, and it is determined that the first CPU 120 is normal and the second CPU 110 malfunctions. This determination has inconsistency as compared to the determination in steps S2 and S61, and it is determined that the second CPU 110 malfunctions, and further, it is determined that the first CPU 120 is normal according to step S32. Therefore, it is possible to continue the processing of the first CPU 120 in this case.

The process proceeds to step S35 in the case of the malfunction in step S32, and it is determined that the first CPU 120 malfunctions.

When the first CPU 120 is determined to be normal in step S61, the process proceeds to step S71. In step S71, the malfunction of the second microcomputer 200 and the malfunction of the third CPU 210 of the second microcomputer 200 are monitored, and the determination is performed based on a result of the first external communication functional unit 160 (Determination Mode 3). When it is normal, the process proceeds to step S31.

In step S31, the malfunction of the first microcomputer 100 and the malfunction of the first CPU 120 of the first microcomputer are monitored, and the determination is performed based on the result of the second external communication functional unit 260 (Determination Mode 1). When it is normal, it is determined that the first CPU 120 is normal as it has been determined already as in the above-described step S21. In the case of the malfunction, the process proceeds to step S33, and it is determined that the second CPU 110 and the first CPU 120 malfunction. This determination is diagnosed on consideration of a case in which the first self-diagnosis functional unit 115 malfunctions, and there is inconsistency as compared to each determination in step S11 and step S21, and thus, it is determined that the second CPU 110 and the first CPU 120 malfunction.

When it is determined not to be normal in step S71, the process proceeds to step S73. In step S73, the diagnosis is performed on consideration of a case in which the second self-diagnosis functional unit 225 malfunctions, and there is inconsistency as compared to each determination in step S41 and step S51, and thus, it is determined that the third CPU 210 and the fourth CPU 220 malfunction. The process proceeds to the above-described step S31 after the determination in step S73.

In step S62, it is determined whether the first CPU 120 is normal similarly to step S61, and the process proceeds to step S72 when it is determined to be normal or step S76 when it is determined not to be normal.

In step S72, the malfunction of the second microcomputer 200 and the malfunction of the third CPU 210 of the second microcomputer 200 are monitored, and the determination is performed based on the result of the first external communication functional unit 160 (Determination Mode 3). When it is normal, the process proceeds to step S74.

In step S74, it is determined that the third CPU 210 is normal, and the fourth CPU 220 malfunctions. This determination has inconsistency as compared to the determination in step S5, and it is determined that the fourth CPU 220 malfunctions, and further, it is determined that the third CPU 210 is normal according to step S72. Therefore, it is possible to continue the processing of the third CPU 210 in this case.

The process proceeds to step S75 in the case of the malfunction in step S72, and it is determined that the third CPU 210 malfunctions.

In step S76, it is determined that the first microcomputer 100 and the second microcomputer 200 malfunction at the same time, but it is not assumed that the respective microcomputers as different modules malfunction at the same time because of the same reason and determination thereof is ignored.

The integrated control unit 300 performs the control such that the PWM signal transmitted from the first PWM signal generation unit 150 is not supplied to the first motor 400 but is blocked, for example, when it is determined that the first CPU 120 or the second CPU 110 malfunctions. In addition, the integrated control unit 300 performs the control such that the PWM signal transmitted from the second PWM signal generation unit 250 is not supplied to the second motor 500 but is blocked, for example, when it is determined that the third CPU 210 or the fourth CPU 220 malfunctions.

Although it is erroneously determined that the first CPU 120 and the second CPU 110 malfunction when the third CPU 210 of the second microcomputer 200 malfunctions in the first and second embodiments, there is no erroneous determination in the third embodiment because the malfunction of the third CPU 210 of the second microcomputer 200 is also determined.

Fourth Embodiment

Figure 7:
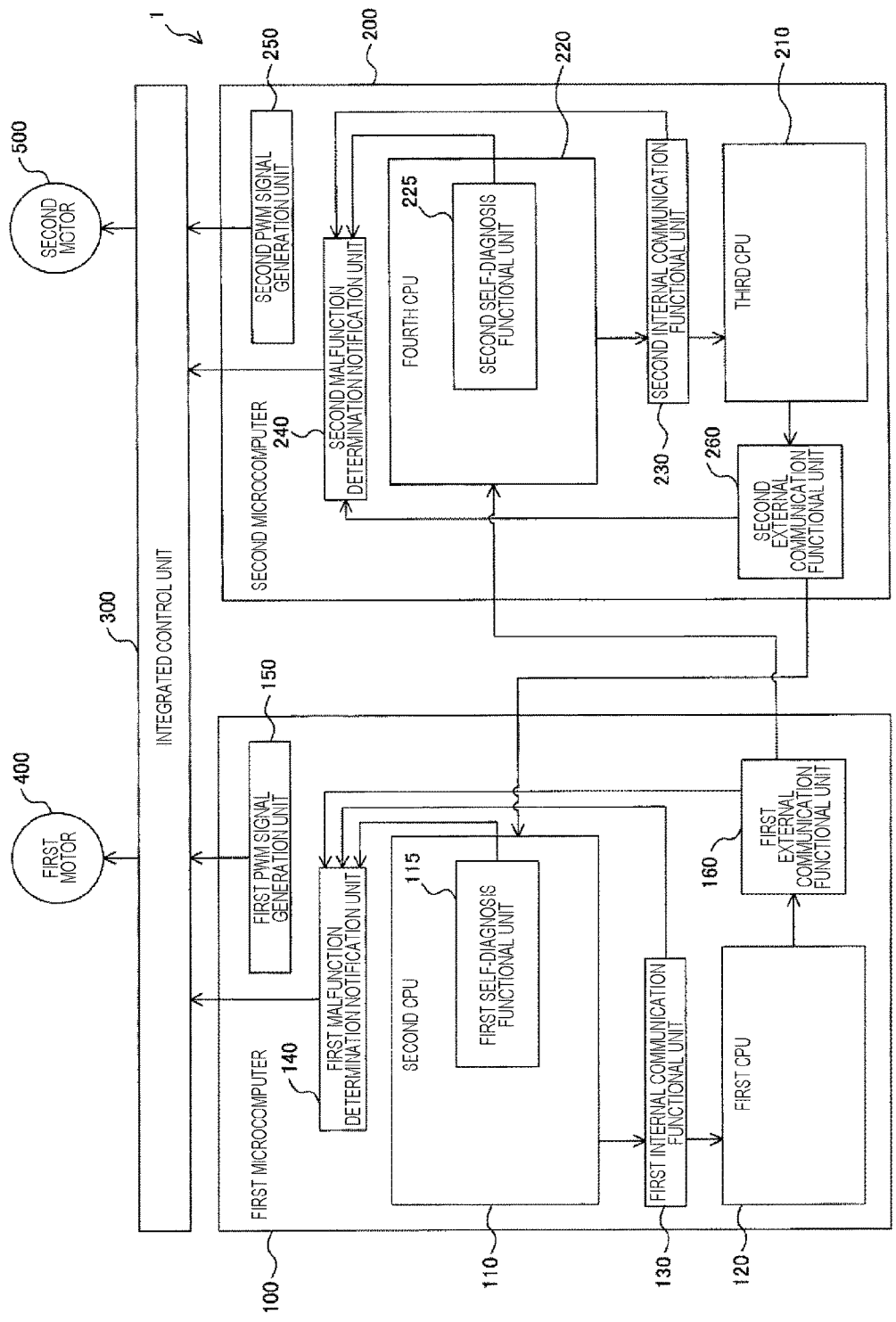
FIG. 7 is a circuit diagram of a motor control device according to a fourth embodiment.

FIG. 7 is a circuit diagram illustrating an overall configuration of a motor control device 1 according to a fourth embodiment. It is configured such that a connection relationship between a first external communication functional unit 160 and a second external communication functional unit 260 is different from that according to the third embodiment. The motor control device 1 is provided with a first microcomputer 100, a second microcomputer 200, an integrated control unit 300, a first motor 400, and a second motor 500.

The first microcomputer 100 is provided with a first CPU 120, a second CPU 110, a first internal communication functional unit 130, a first malfunction determination notification unit 140, and a first PWM signal generation unit 150, and generates a PWM signal for control of a motor or performs diagnosis of a malfunction in the first CPU 120 and the second CPU 110 or the like. The first microcomputer 100 is a multi-core microcomputer which includes the second CPU 110 and the first CPU 120.

The first internal communication functional unit 130 is provided between the second CPU 110 and the first CPU 120 and detects the malfunction of the first CPU 120 by performing communication via a shared memory or the like.

The first malfunction determination notification unit 140 receives notification of the malfunction from the first internal communication functional unit 130 or the like and notifies the integrated control unit 300 of the CPU that has been determined to actually malfunction as a result of a retrial. To be specific, when receiving the notification of the malfunction from a first self-diagnosis functional unit 115 and it is determined as the actual malfunction, the first malfunction determination notification unit 140 notifies the integrated control unit 300 that the second CPU 110 malfunctions. In addition, when receiving the notification of the malfunction from the first internal communication functional unit 130 and it is determined as the actual malfunction, the first malfunction determination notification unit 140 notifies the integrated control unit 300 that the first CPU 120 malfunctions. In addition, when receiving the notification of the malfunction from the first external communication functional unit 160 and it is determined as the actual malfunction, the first malfunction determination notification unit 140 notifies the integrated control unit 300 that a fourth CPU 220 malfunctions.

The first PWM signal generation unit 150 creates the PWM signal for the motor control and outputs the PWM signal to the integrated control unit 300. The first PWM signal generation unit 150 is operated by the second CPU 110.

The second CPU 110 is provided with the first self-diagnosis functional unit 115. The second CPU 110 has the same configuration as the configuration illustrated in the first embodiment, and thus, details thereof will not be described.

The first self-diagnosis functional unit 115 diagnoses the malfunction of the second CPU 110 by comparing a calculation result of a first core 111 (not illustrated) and a calculation result of a second core 112, and notifies the first malfunction determination notification unit 140 of the malfunction.

The first internal communication functional unit 130 is provided between the second CPU 110 and the first CPU 120, the second CPU 110 performs communication with the first CPU 120 via a shared memory or the like, and the malfunction of the first CPU 120 is detected by performing the communication via the shared memory or the like. When the malfunction is detected, the first malfunction determination notification unit 140 is notified of the malfunction.

The first external communication functional unit 160 detects a malfunction of the second microcomputer 200 by communicating with the fourth CPU 220 of the second microcomputer 200 and the first microcomputer 100. To be specific, example calculation from the first CPU 120 is processed again by the fourth CPU 220, and the first external communication functional unit 160 confirms whether both results thereof match each other. When both the results do not match each other, it is determined that the fourth CPU 220 malfunctions, and the first malfunction determination notification unit 140 is notified of the malfunction.

The second microcomputer 200 is provided with a third CPU 210, the fourth CPU 220, the second internal communication functional unit 230, the second external communication functional unit 260, a second malfunction determination notification unit 240, and a second PWM signal generation unit 250, and generates a PWM signal for control of a motor or performs self-diagnosis of the second microcomputer 200 and diagnosis of a malfunction in the first microcomputer 100. The second microcomputer 200 is a multi-core microcomputer which includes the fourth CPU 220 and the third CPU 210.

The fourth CPU 220 is provided with a second self-diagnosis functional unit 225. The second self-diagnosis functional unit 225 has the same configuration as the first self-diagnosis functional unit 115 of the second CPU 110, diagnoses a malfunction of the fourth CPU 220, and notifies the second malfunction determination notification unit 240 of the malfunction.

The second internal communication functional unit 230 is provided between the fourth CPU 220 and the third CPU 210, the fourth CPU 220 performs communication with the third CPU 210 via a shared memory or the like, and a malfunction of the third CPU 210 is detected by performing the communication via the shared memory or the like. When the malfunction is detected, the second malfunction determination notification unit 240 is notified of the malfunction.

The second external communication functional unit 260 detects a malfunction of the first microcomputer 100 by communicating with the second CPU 110 of the first microcomputer 100 and the second microcomputer 200. To be specific, example calculation from the third CPU 210 is processed again by the second CPU 110, and the second external communication functional unit 260 confirms whether both results thereof match each other. When both the results do not match each other, it is determined that the second CPU 110 malfunctions, and the second malfunction determination notification unit 240 is notified of the malfunction.

The second malfunction determination notification unit 240 receives the notification of the malfunction from the second self-diagnosis functional unit 225, the second internal communication functional unit 230, and the second external communication functional unit 260, and notifies the integrated control unit 300 of the CPU that has been determined to actually malfunction as a result of a retrial. To be specific, when receiving the notification of the malfunction from the second self-diagnosis functional unit 225 and it is determined as the actual malfunction, the second malfunction determination notification unit 240 notifies the integrated control unit 300 that the fourth CPU 220 malfunctions. In addition, when receiving the notification of the malfunction from the second internal communication functional unit 230 and it is determined as the actual malfunction, the second malfunction determination notification unit 240 notifies the integrated control unit 300 that the third CPU 210 malfunctions. In addition, when receiving the notification of the malfunction from the second external communication functional unit 260 and it is determined as the actual malfunction, the second malfunction determination notification unit 240 notifies the integrated control unit 300 that the second CPU 110 malfunctions.

The second PWM signal generation unit 250 creates the PWM signal for the motor control and outputs the PWM signal to the integrated control unit 300.

The integrated control unit 300 performs determination of a malfunction based on each notification from the first malfunction determination notification unit 140 and the second malfunction determination notification unit 240, supplies the PWM signal transmitted from the first PWM signal generation unit 150 to the first motor 400, and supplies the PWM signal transmitted from the second PWM signal generation unit 250 to the second motor 500 when it is determined to be normal. The integrated control unit 300 performs the determination of the malfunction based on each notification from the first malfunction determination notification unit 140 and the second malfunction determination notification unit 240 and performs control so as not to supply the PWM signal transmitted from the first PWM signal generation unit 150 to the first motor 400, for example, when it is determined that the second CPU 110 malfunctions. Here, the first motor 400 is a drive motor which is used to drive the vehicle, and the second motor 500 is a regenerative motor.

Figure 8:
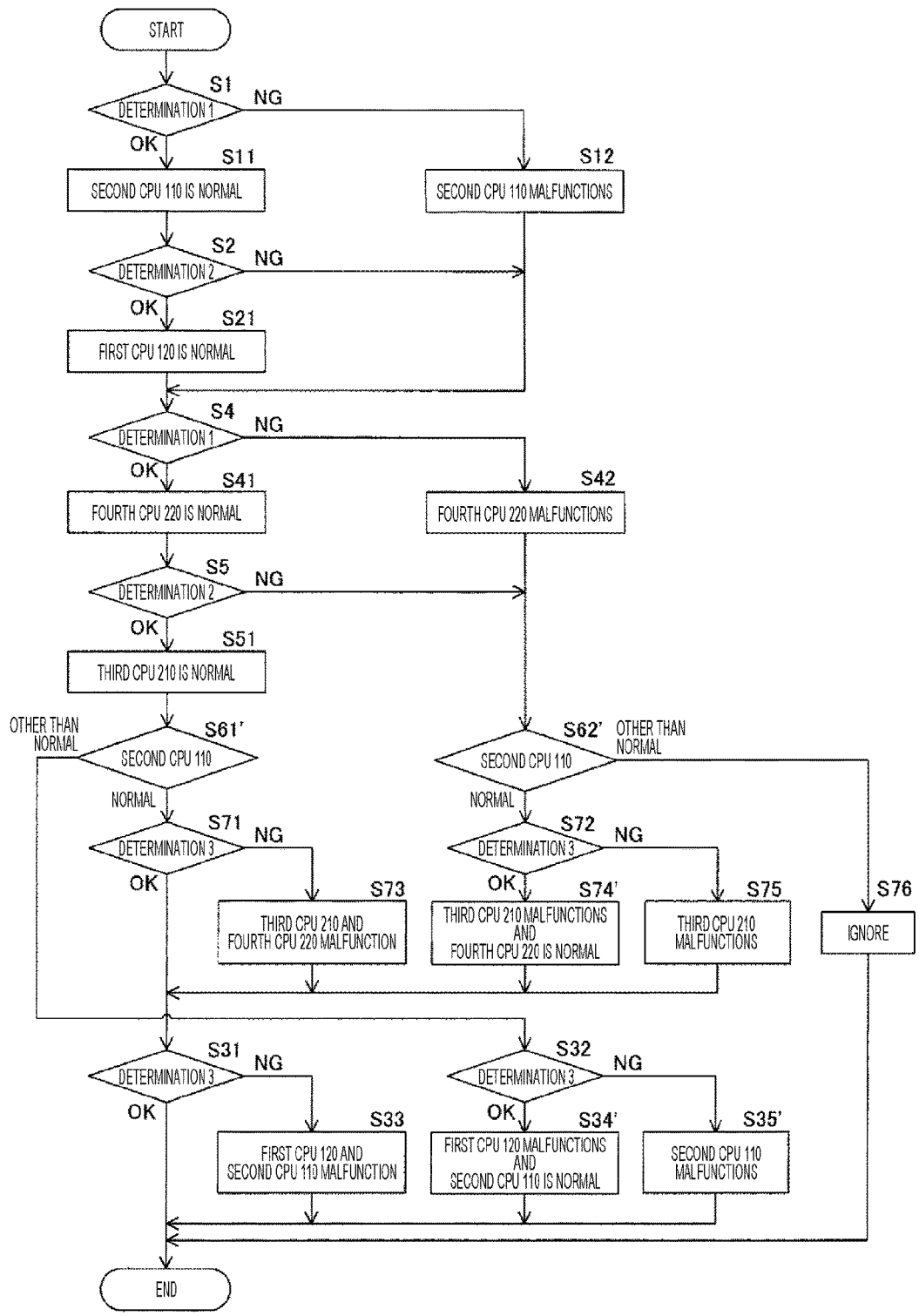
FIG. 8 is a flowchart for describing an operation according to the fourth embodiment.

FIG. 8 is a flowchart for describing a malfunction determination operation of the integrated control unit 300. The first microcomputer 100 and the second microcomputer 200 constantly perform the malfunction diagnosis, and the integrated control unit 300 is notified of each result of the diagnosis by the first malfunction determination notification unit 140 of the first microcomputer 100 and the second malfunction determination notification unit 240 of the second microcomputer 200.

The flowchart of FIG. 8 to be described hereinafter illustrates an operation that is executed by a control unit (not illustrated) of the integrated control unit 300. Incidentally, a logic circuit operating in the same manner as the operation illustrated in this flowchart may be provided inside the integrated control unit 300 as hardware.

The integrated control unit 300 starts the determination of the malfunction in the first microcomputer 100 and the second microcomputer 200. Incidentally, the malfunction represents a state in which an operation that is not assumed is steadily and continuously executed and includes a hardware malfunction and a software malfunction.

In step S1, the malfunction of the second CPU 110 of the first microcomputer 100 is monitored, and the determination is performed based on a result of the first self-diagnosis functional unit 115 of the first microcomputer 100 (Determination Mode 1). When it is normal, the process proceeds to step S11, and it is determined that the second CPU 110 is normal. In the case of the malfunction, the process proceeds to step S12, and it is determined that the second CPU 110 malfunctions. The process proceeds to step S2 after the determination in step S11, and the process proceeds to step S4 after the determination in step S12.

In step S2, the malfunction is determined between the first CPU 120 and the second CPU 110 of the first microcomputer 100, and the determination is performed based on a result of the first internal communication functional unit 130 (Determination Mode 2). When it is normal, the process proceeds to step S21, and it is determined that the first CPU 120 is normal. In the case of the malfunction, the process proceeds to step S4. The process proceeds to step S4 after the determination in step S21.

In step S4, the malfunction of the fourth CPU 220 of the second microcomputer 200 is monitored, and the determination is performed based on a result of the second self-diagnosis functional unit 225 of the second microcomputer 200 (Determination Mode 1). When it is normal, the process proceeds to step S41, and it is determined that the fourth CPU 220 is normal. In the case of the malfunction, the process proceeds to step S42, and it is determined that the fourth CPU 220 malfunctions. The process proceeds to step S5 after the determination in step S41, and the process proceeds to step S62' after the determination in step S42.

In step S5, the malfunction is monitored between the third CPU 210 and the fourth CPU 220 of the second microcomputer 200, and the determination is performed based on a result of the second internal communication functional unit 230 (Determination Mode 2). When it is normal, the process proceeds to step S51, and it is determined that the third CPU 210 is normal. In the case of the malfunction, the process proceeds to step S62'. The process proceeds to step S61' after the determination in step S51.

In step S61', it is determined whether the second CPU 110 is normal, and the process proceeds to step S71 when it is determined to be normal or step S32 when it is determined not to be normal.

In step S32, the malfunction of the first microcomputer 100 and the malfunction of the second CPU 110 of the first microcomputer are monitored, and the determination is performed based on a result of the second external communication functional unit 260 (Determination Mode 3). When it is normal, the process proceeds to step S34', and it is determined that the first CPU 120 malfunctions and the second CPU 110 is normal. This determination has inconsistency as compared to the determination in steps S1 and S61', and it is determined that the second CPU 110 is normal, and further, it is determined that the first CPU 120 malfunctions according to step S32. Therefore, it is possible to continue the processing of the second CPU 110 in this case.

The process proceeds to step S35' in the case of the malfunction in step S32, and it is determined that the second CPU 110 malfunctions.

When the second CPU 110 is normal in step S61', the process proceeds to step S71. In step S71, each malfunction of the second microcomputer 200 and the fourth CPU 220 of the second microcomputer 200 is monitored, and the determination is performed based on a result of the first external communication functional unit 160 (Determination Mode 3). When it is normal, the process proceeds to step S31.

In step S31, the malfunction of the first microcomputer 100 and the malfunction of the second CPU 110 of the first microcomputer are monitored, and the determination is performed based on the result of the second external communication functional unit 260. When it is normal, it is determined that the first CPU 120 is normal as it has been determined already as in the above-described steps S21 and S61'. In the case of the malfunction, the process proceeds to step S33, and it is determined that the second CPU 110 and the first CPU 120 malfunction. This determination is diagnosed on consideration of a case in which the first self-diagnosis functional unit 115 malfunctions, and there is inconsistency as compared to each determination in step S11 and step S21, and thus, it is determined that the second CPU 110 and the first CPU 120 malfunction.

When it is determined not to be normal in step S71, the process proceeds to step S73. In step S73, the diagnosis is performed on consideration of a case in which the second self-diagnosis functional unit 225 malfunctions, and there is inconsistency as compared to each determination in step S41 and step S51, and thus, it is determined that the third CPU 210 and the fourth CPU 220 malfunction. The process proceeds to the above-described step S31 after the determination in step S73.

In step S62', it is determined whether the second CPU 110 is normal similarly to step S61', and the process proceeds to step S72 when it is determined to be normal or step S76 when it is determined not to be normal.

In step S72, each malfunction of the second microcomputer 200 and the fourth CPU 220 of the second microcomputer 200 is monitored, and the determination is performed based on a result of the first external communication functional unit 160 (Determination Mode 3). When it is normal, the process proceeds to step S74'. When it is not normal, the process proceeds to step 75.

In step S74', it is determined that the third CPU 210 malfunctions, and the fourth CPU 220 is normal. This determination has inconsistency as compared to the determination in step S4, and it is determined that the fourth CPU 220 is normal, and further, it is determined that the third CPU 210 malfunctions according to step 72. Therefore, it is possible to continue the processing of the fourth CPU 220 in this case.

The process proceeds to step S75 in the case of the malfunction in step S72, and it is determined that the third CPU 210 malfunctions.

In step S76, it is determined that the first microcomputer 100 and the second microcomputer 200 malfunction at the same time, but it is not assumed that the respective microcomputers as different modules malfunction at the same time because of the same reason and determination thereof is ignored.

The integrated control unit 300 performs the control such that the PWM signal transmitted from the first PWM signal generation unit 150 is not supplied to the first motor 400 but is blocked, for example, when it is determined that the first CPU 120 or the second CPU 110 malfunctions. In addition, the integrated control unit 300 performs the control such that the PWM signal transmitted from the second PWM signal generation unit 250 is not supplied to the second motor 500 but is blocked, for example, when it is determined that the third CPU 210 or the fourth CPU 220 malfunctions.

Although it is erroneously determined that the first CPU 120 and the second CPU 110 malfunction when the third CPU 210 of the second microcomputer 200 malfunctions in the first and second embodiments, there is no erroneous determination in the fourth embodiment because the malfunction of the third CPU 210 of the second microcomputer 200 is also determined.

Modified Example

The present invention can be implemented by modifying the above-described first to fourth embodiments as follows.

(1) The first self-diagnosis functional unit 115, the first internal communication functional unit 130, the first malfunction determination notification unit 140, and the first PWM signal generation unit 150 are illustrated as a circuit configuration diagram inside the first microcomputer 100, but the same functions thereof may be implemented by processing of software inside the first microcomputer 100. In addition, the second self-diagnosis functional unit 225, the second internal communication functional unit 230, the second malfunction determination notification unit 240, and the second PWM signal generation unit 250 are illustrated as a circuit configuration diagram inside the second microcomputer 200, but the same functions thereof may be implemented by processing of software inside the second microcomputer 200.

According to the above-described embodiments, the following operational effects are obtained. (1) The motor control device is provided with the integrated control unit 300 that receives information relating to the malfunction from the first microcomputer 100 and the second microcomputer 200 and controls the motors 400 and 500. The first microcomputer 100 includes the first CPU 120, the second CPU 110 having the first self-diagnosis functional unit 115, and the first internal communication functional unit 130 which detects the malfunction of the first CPU 120 through communication from the second CPU 110 to the first CPU 120. The second microcomputer 200 includes the third CPU 210 and the second external communication functional unit 260 which detects the malfunction of the first microcomputer 100 through communication from the third CPU 210 to the first microcomputer 100. The integrated control unit 300 monitors the malfunction of the first CPU 120 based on each malfunction detection result of the first internal communication functional unit 130 and the second external communication functional unit 260 even when the first self-diagnosis functional unit 115 determines that the second CPU 110 malfunctions in the first microcomputer 100, and continues the processing of the first CPU 120 based on such a monitoring result. Therefore, it is possible to continue control of the first CPU even when it is diagnosed that the second CPU malfunctions, and accordingly, it is possible to safely continue the control of the motor to be mounted to the vehicle.

The present invention is not limited to the above-described embodiments, and other modes, which are conceivable inside a scope of a technical idea of the present invention, are also included in a scope of the present invention as long as characteristics of the present invention are not impaired. In addition, the invention may be configured by combining the embodiments and a plurality of modified examples.

REFERENCE SIGNS LIST 100 first microcomputer
200 second microcomputer
300 integrated control unit
400 first motor
500 second motor
120 first CPU
110 second CPU
115 first self-diagnosis functional unit
130 first internal communication functional unit
140 first malfunction determination notification unit
150 first PWM signal generation unit
160 first external communication functional unit
210 third CPU
220 fourth CPU
225 second self-diagnosis functional unit
230 second internal communication functional unit
240 second malfunction determination notification unit
250 second PWM signal generation unit
260 second external communication functional unit

The invention claimed is:

1. A motor control device comprising:
an integrated control unit that receives information relating to a malfunction from a first microcomputer and a second microcomputer and controls a motor,
wherein the first microcomputer includes a first CPU, a second CPU which has a first self-diagnosis functional unit, and a first internal communication functional unit which detects a malfunction of the first CPU through communication from the second CPU to the first CPU,
the second microcomputer is a multi-core microcomputer which includes a third CPU and a fourth CPU and a second external communication functional unit which detects a malfunction of the first microcomputer through communication from the third CPU to the first microcomputer,
the fourth CPU having a second self-diagnosis functional unit, and a second internal communication functional unit which detects a malfunction of the third CPU through communication from the fourth CPU to the third CPU,
the first microcomputer includes a first external communication functional unit which detects the malfunction of the third CPU of the second microcomputer through communication from the first CPU to the second microcomputer,
the integrated control unit monitors the malfunction of the first CPU based on each malfunction detection result of the first internal communication functional unit and the second external communication functional unit even when the first self-diagnosis functional unit determines that the second CPU malfunctions in the first microcomputer, and continues processing of the first CPU based on a result of the monitoring, and
the integrated control unit monitors the malfunction of the third CPU based on each malfunction detection result of the second internal communication functional unit and the first external communication functional unit even when the second self-diagnosis functional unit determines that the fourth CPU malfunctions in the second microcomputer, and continues processing of the third CPU based on a result of the monitoring.

2. The motor control device according to claim 1, wherein the first microcomputer is a multi-core microcomputer which includes the second CPU and the first CPU,
the second CPU includes a first core to execute a calculation process and a second core to execute a calculation process,
the first self-diagnosis functional unit detects a malfunction of the second CPU by comparing a calculation result of the first core and a calculation result of the second core, and
the first internal communication functional unit detects the malfunction of the first CPU by performing communication with the first core and the first CPU.

3. The motor control device according to claim 1, wherein the first CPU and the second CPU perform processing relating to control of a first motor which is a motor for a vehicle, and
the integrated control unit monitors the malfunction of the first CPU based on each malfunction detection result of the first internal communication functional unit and the second external communication functional unit even when the first self-diagnosis functional unit determines that the second CPU malfunctions in the first microcomputer, and continues the control of the first motor through the processing of the first CPU based on the monitoring result.

4. The motor control device according to claim 2, wherein the first CPU includes a third core to execute a calculation process, and the first internal communication functional unit performs communication from the first core to the third core and detects the malfunction of the first CPU, and further, performs communication from the third core to the first core and detects the malfunction of the second CPU.

5. The motor control device according to claim 1, wherein
the second external communication functional unit detects a malfunction of the fourth CPU by performing communication between the first CPU and the fourth CPU,
the first microcomputer includes a first external communication functional unit which detects the malfunction of the fourth CPU of the second microcomputer through communication from the first CPU to the second microcomputer, and
the integrated control unit monitors the malfunction of the fourth CPU based on each malfunction detection result of the second internal communication functional unit and the first external communication functional unit even when the second self-diagnosis functional unit determines that the fourth CPU malfunctions in the second microcomputer, and continues processing of the fourth CPU based on a result of the monitoring.

6. The motor control device according to claim 1, wherein
the first CPU and the second CPU perform processing relating to control of a first motor which is a motor for a vehicle, and
the integrated control unit monitors the malfunction of the first CPU based on each malfunction detection result of the first internal communication functional unit and the second external communication functional unit even when the first self-diagnosis functional unit determines that the second CPU malfunctions in the first microcomputer, and continues the control of the first motor through the processing of the first CPU based on the monitoring result.

7. The motor control device according to claim 2, wherein
the first CPU includes a third core to execute a calculation process, and
the first internal communication functional unit performs communication from the first core to the third core and detects the malfunction of the first CPU, and further, performs communication from the third core to the first core and detects the malfunction of the second CPU.

8. A motor control device comprising:
an integrated control unit that receives information relating to a malfunction from a first microcomputer and a second microcomputer and controls a motor,
wherein the first microcomputer includes a first CPU, a second CPU which has a first self-diagnosis functional unit, and a first internal communication functional unit which detects a malfunction of the first CPU through communication from the second CPU to the first CPU,
the second microcomputer is a multi-core microcomputer which includes a third CPU and a fourth CPU and a second external communication functional unit which detects a malfunction of the first microcomputer through communication from the third CPU to the first microcomputer,
the fourth CPU having a second self-diagnosis functional unit, and a second internal communication functional unit which detects a malfunction of the third CPU through communication from the fourth CPU to the third CPU,
the integrated control unit monitors the malfunction of the first CPU based on each malfunction detection result of the first internal communication functional unit and the second external communication functional unit even when the first self-diagnosis functional unit determines that the second CPU malfunctions in the first microcomputer, and continues processing of the first CPU based on a result of the monitoring,
the second external communication functional unit detects a malfunction of the fourth CPU by performing communication between the first CPU and the fourth CPU,
the first microcomputer includes a first external communication functional unit which detects the malfunction of the fourth CPU of the second microcomputer through communication from the first CPU to the second microcomputer, and
the integrated control unit monitors the malfunction of the fourth CPU based on each malfunction detection result of the second internal communication functional unit and the first external communication functional unit even when the second self-diagnosis functional unit determines that the fourth CPU malfunctions in the second microcomputer, and continues processing of the fourth CPU based on a result of the monitoring.

9. The motor control device according to claim 8, wherein
the first microcomputer is a multi-core microcomputer which includes the second CPU and the first CPU,
the second CPU includes a first core to execute a calculation process and a second core to execute a calculation process,
the first self-diagnosis functional unit detects a malfunction of the second CPU by comparing a calculation result of the first core and a calculation result of the second core, and
the first internal communication functional unit detects the malfunction of the first CPU by performing communication with the first core and the first CPU.

* * * * *